US010355474B2

(12) United States Patent
Okamoto (10) Patent No.: US 10,355,474 B2
(45) Date of Patent: Jul. 16, 2019

(54) INRUSH CURRENT PREVENTION CIRCUIT, INRUSH CURRENT PREVENTION METHOD, AND COMPUTER READABLE MEDIUM (71) Applicant: FANUC CORPORATION, Yamanashi (JP)

(72) Inventor: Jun Okamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 3 days.

(21) Appl. No.: 15/835,555

(22) Filed: Dec. 8, 2017

(65) Prior Publication Data
US 2018/0175611 A1 Jun. 21, 2018

(30) Foreign Application Priority Data

Dec. 19, 2016 (JP) .................. 2016-245083

(51) Int. Cl.
H02H 9/02 (2006.01)
H02H 9/00 (2006.01)
(Continued)

(52) U.S. Cl.
CPC .......... H02H 9/001 (2013.01); H02H 1/0007 (2013.01); H02H 3/025 (2013.01);
(Continued)

(58) Field of Classification Search
CPC ........ H02H 3/025; H02H 5/041; H02H 5/042; H02H 9/025; H02H 5/046
(Continued)

(56) References Cited

U.S. PATENT DOCUMENTS 6,917,503 B2 * 7/2005 Dai ........................ H02H 9/004
361/93.1
7,072,160 B1 * 7/2006 Schweigert ............... H02J 1/14
361/79
(Continued)

FOREIGN PATENT DOCUMENTS

CN 102761114 10/2012
CN 104052038 9/2014
(Continued)

OTHER PUBLICATIONS

Office Action dated Jul. 3, 2018 in corresponding Japanese Application No. 2016-245083.
(Continued)

Primary Examiner — Dharti H Patel
(74) Attorney, Agent, or Firm — Wenderoth, Lind & Ponack, L.L.P.

(57) ABSTRACT

An inrush current prevention circuit includes: a voltage detection unit configured to detect a value of an input voltage applied by a power supply; a current detection unit configured to detect a value of an input current input from the power supply; a current limiting element configured to limit the input current; a voltage drop detection unit configured to detect a voltage drop in the power supply resulting from inrush currents using a detection voltage value detected by the voltage detection unit and a detection current value detected by the current detection unit; and a control unit configured to decrease a current limiting level of the current limiting element when the voltage drop detection unit detects the voltage drop.

11 Claims, 6 Drawing Sheets (51) Int. Cl.
*H02H 5/04* (2006.01)
*H02H 3/02* (2006.01)
*H02H 1/00* (2006.01)

(52) U.S. Cl.
CPC ............ *H02H 5/041* (2013.01); *H02H 5/042* (2013.01); *H02H 5/046* (2013.01); *H02H 9/025* (2013.01)

(58) Field of Classification Search
USPC .......................................................... 361/79
See application file for complete search history.

(56) References Cited

U.S. PATENT DOCUMENTS

| 7,268,992 B2 * | 9/2007 | Hallak .................... H02H 3/087 361/9 |
| 2011/0116196 A1 * | 5/2011 | Kellis .................. H02H 7/0816 361/30 |
| 2015/0130438 A1 * | 5/2015 | Kang ....................... G05F 1/573 323/282 |
| 2017/0063074 A1 * | 3/2017 | Yasusaka ............ H01L 27/0255 |

FOREIGN PATENT DOCUMENTS

| CN | 105871298 | 8/2016 |
| CN | 205544245 | 8/2016 |
| JP | 58-193825 | 12/1983 |
| JP | 2005-253195 | 9/2005 |
| JP | 2006-506038 | 2/2006 |
| JP | 2008-529159 | 7/2008 |
| JP | 2011-72133 | 4/2011 |
| JP | 2011-167012 | 8/2011 |
| JP | 2012-152001 | 8/2012 |
| WO | 2004/045037 | 5/2004 |

OTHER PUBLICATIONS

Office Action dated Jan. 17, 2019 in Chinese Patent Application No. 201711340423.8.

\* cited by examiner

INRUSH CURRENT PREVENTION CIRCUIT, INRUSH CURRENT PREVENTION METHOD, AND COMPUTER READABLE MEDIUM

This application is based on and claims the benefit of priority from Japanese Patent Application No. 2016-245083, filed on 19 Dec. 2016, the content of which is incorporated herein by reference.

BACKGROUND OF THE INVENTION

Field of the Invention

The present invention relates to an inrush current prevention circuit, an inrush current prevention method, and a computer readable medium, and particularly, to an inrush current prevention circuit having a current limiting element that limits an input current, an inrush current prevention method, and a computer readable medium.

Related Art

An inrush current prevention circuit is used for suppressing an inrush current flowing into an apparatus, and examples of the inrush current prevention circuit are disclosed in Patent Documents 1 to 3. In an inrush current prevention circuit illustrated in FIG. 3 of Patent Document 1, a MOSFET 16 is used as an inrush current limiting resistor, faults in the MOSFET are detected by an open-circuit voltage monitoring unit 15 monitoring a source-drain voltage of the MOSFET and a gate voltage monitoring unit 17 monitoring a gate voltage of the MOSFET, and a shutdown element 102 is operated. Moreover, in the inrush current prevention circuit illustrated in FIG. 3, the temperature of the MOSFET is detected using an overheat detection unit 18 such as a PTC thermistor or a NTC thermistor, and the shutdown element such as a fuse or a circuit breaker is operated regardless of the state of other detection circuits when the detected temperature exceeds an overheat detection threshold.

FIG. 2 of Patent Document 2 illustrates a configuration of an inrush current prevention circuit. In FIG. 2, when an input voltage Vin input to an activation circuit 2 reaches a detection threshold Vdet, a transistor 26 is turned on, and a ramp wave gate voltage Vg is applied to the gate of a MOSFET 33 of a current limiting circuit 3. When the MOSFET 33 is turned on due to a rise of the gate voltage Vg and the drain-source voltage decreases, a voltage drop is delivered to the gate via a capacitor 34 and a resistor 35. As a result, the gate potential becomes constant and the current flowing into the MOSFET 33 becomes constant. When a charge voltage of an input capacitor 6 is gradually charged by the ramp wave and charge of the input capacitor 6 is completed, the gate potential of the MOSFET 33 starts rising up to an operating voltage of a Zener diode 27 and is clamped to a fixed value.

FIG. 1 of Patent Document 3 illustrates a configuration of an inrush current limiter circuit 20. In FIG. 1, a current sensor 61 adjusts VDRIVE in order to limit the magnitude of a load current ILOAD to a predetermined maximum value. An undervoltage lockout circuit 64 detects the magnitude of a supply voltage Vsupp and turns off a transistor 50 until the supply voltage Vsupp becomes higher than a certain level. An overvoltage shutdown circuit 65 disables a detection circuit 30 and a transistor 50 when the supply voltage Vsupp rises to a shutdown level or higher. A thermal shutdown circuit 63 turns off the transistor 50 when the temperature thereof rises up to a threshold temperature.

Patent Document 1: Japanese Unexamined Patent Application, Publication No. 2012-152001 (FIG. 3 and the like)
Patent Document 2: Japanese Unexamined Patent Application, Publication No. 2011-167012
Patent Document 3: Japanese Unexamined Patent Application (Translation of PCT Application), Publication No. 2006-506038 (FIG. 1 and the like)

SUMMARY OF THE INVENTION

The inrush current prevention circuits disclosed in Patent Documents 1 to 3 can suppress inrush currents input to apparatuses. However, when current is supplied from a single power supply to a plurality of apparatuses in a distributed manner, inrush currents may occur in individual apparatuses.

When the occurrence timings of inrush currents in the respective apparatuses overlap, a problem such as a voltage drop may occur due to current capacity shortage in the power supply.

An object of the present invention is to provide an inrush current prevention circuit, an inrush current prevention method, and a computer readable medium capable of preventing a voltage drop due to current capacity shortage in a power supply.

(1) An inrush current prevention circuit (for example, an inrush current prevention circuit 10, 10A to be described later) according to the present invention includes:
a voltage detection unit (for example, a voltage detection unit 11 to be described later) configured to detect a value of an input voltage applied by a power supply (for example, a power supply 3 to be described later);
a current detection unit (for example, a current detection unit 13 to be described later) configured to detect a value of an input current input from the power supply;
a current limiting element (for example, a current limiting element 12 to be described later) configured to limit the input current;
a voltage drop detection unit (for example, a voltage drop detection unit 15 to be described later) configured to a voltage drop in the power supply resulting from inrush currents using a detection voltage value detected by the voltage detection unit and a detection current value detected by the current detection unit; and
a control unit (for example, a control unit 14 to be described later) configured to decrease a current limiting level of the current limiting element when the voltage drop detection unit detects the voltage drop.

(2) In the inrush current prevention circuit according to (1), it is preferable that the voltage drop detection unit detects the voltage drop on the basis of a value obtained by dividing a difference between the detection voltage value and a reference voltage value by a difference between the detection current value and a reference current value.

(3) In the inrush current prevention circuit according to (1) or (2), it is preferable that the inrush current prevention circuit further includes:
a temperature detection element (for example, a temperature detection element 16 to be described later) configured to detect the temperature of the current limiting element; and
a temperature determination unit (for example, a temperature determination unit 17 to be described later) configured to determine whether a detection temperature value detected by the temperature detection element exceeds an upper limit threshold, and that the control unit performs a protection operation of the current limiting element when the temperature determination unit determines that the detection temperature value exceeds the upper limit threshold.

(4) In the inrush current prevention circuit according to (3), it is preferable that the protection operation involves interrupting the current of the current limiting element, the temperature determination unit determines whether the detection temperature value of the current limiting element is equal to or lower than a lower limit threshold, and the control unit cancels interruption of the current of the current limiting element when the detection temperature value of the current limiting element is equal to or lower than the lower limit threshold.

(5) In the inrush current prevention circuit according to (3), it is preferable that the protection operation involves interrupting the current of the current limiting element, the temperature determination unit includes a time measuring unit (for example, a timer circuit 173 to be described later) that measures a time elapsed from a time point at which an interrupt instruction signal is sent to the control unit, and the control unit cancels interruption of the current of the current limiting element when the elapsed time reaches a time sufficient for the temperature of the current limiting element to decrease to a predetermined temperature or lower.

(6) An inrush current prevention method in an inrush current prevention circuit (for example, an inrush current prevention circuit 10, 10A to be described later) according to the present invention includes:
detecting a value of an input voltage applied by a power supply (for example, a power supply 3 to be described later);
detecting a value of an input current input from the power supply;
detecting a voltage drop in the power supply resulting from inrush currents using the detected value of the input voltage and the detected value of the input current; and
decreasing a current limiting level of a current limiting element (for example, a current limiting element 12 to be described later) that limits the input current when the voltage drop is detected.

(7) In the inrush current prevention method according to (6), it is preferable that the voltage drop is detected on the basis of a value obtained by dividing a difference between the value of the input voltage and a reference voltage value by a difference between the value of the input current and a reference current value.

(8) In the inrush current prevention method according to (6) or (7), it is preferable that the method further includes:
detecting the temperature of the current limiting element using a temperature detection element (for example, a temperature detection element 16 to be described later); determining whether a detection temperature value detected by the temperature detection element exceeds an upper limit threshold; and
performing a protection operation of the current limiting element when it is determined that the detection temperature value exceeds the upper limit threshold.

(9) In the inrush current prevention method according to (8), it is preferable that the protection operation involves interrupting the current of the current limiting element, and that the method further includes:
determining whether the detection temperature value of the current limiting element is equal to or lower than a lower limit threshold, and
canceling interruption of the current of the current limiting element when the detection temperature value of the current limiting element is equal to or lower than the lower limit threshold.

(10) In the inrush current prevention method according to (8), it is preferable that the protection operation involves interrupting the current of the current limiting element, and that the method further includes:
measuring a time elapsed from a current interruption starting time point using a time measuring unit; and
canceling interruption of the current of the current limiting element when the elapsed time reaches a time sufficient for the temperature of the current limiting element to decrease to a predetermined temperature or lower.

(11) A non-transitory computer readable medium according to the present invention is a computer readable medium having an inrush current prevention program recorded thereon, the program being used in an inrush current prevention circuit (for example, an inrush current prevention circuit 10, 10A to be described later) including:
a voltage detection unit (for example, a voltage detection unit 11 to be described later) configured to detect a value of an input voltage applied by a power supply (for example, a power supply 3 to be described later);
a current detection unit (for example, a current detection unit 13 to be described later) configured to detect a value of an input current input from the power supply;
a current limiting element (for example, a current limiting element 12 to be described later) configured to limit the input current;
a voltage drop detection unit (for example, a voltage drop detection unit 15 to be described later) configured to detect a voltage drop in the power supply; and
a control unit (for example, a control unit 14 to be described later) configured to decrease a current limiting level of the current limiting element when the voltage drop detection unit detects the voltage drop, the program causing a computer as the voltage drop detection unit to execute:
detecting the voltage drop in the power supply resulting from inrush currents using the value of the input voltage detected by the voltage detection unit and the value of the input current detected by the current detection unit; and
notifying the control unit of the detected voltage drop.

According to the present invention, it is possible to prevent a voltage drop due to current capacity shortage in a power supply resulting from inrush currents.

DETAILED DESCRIPTION OF THE INVENTION

Figure 1:
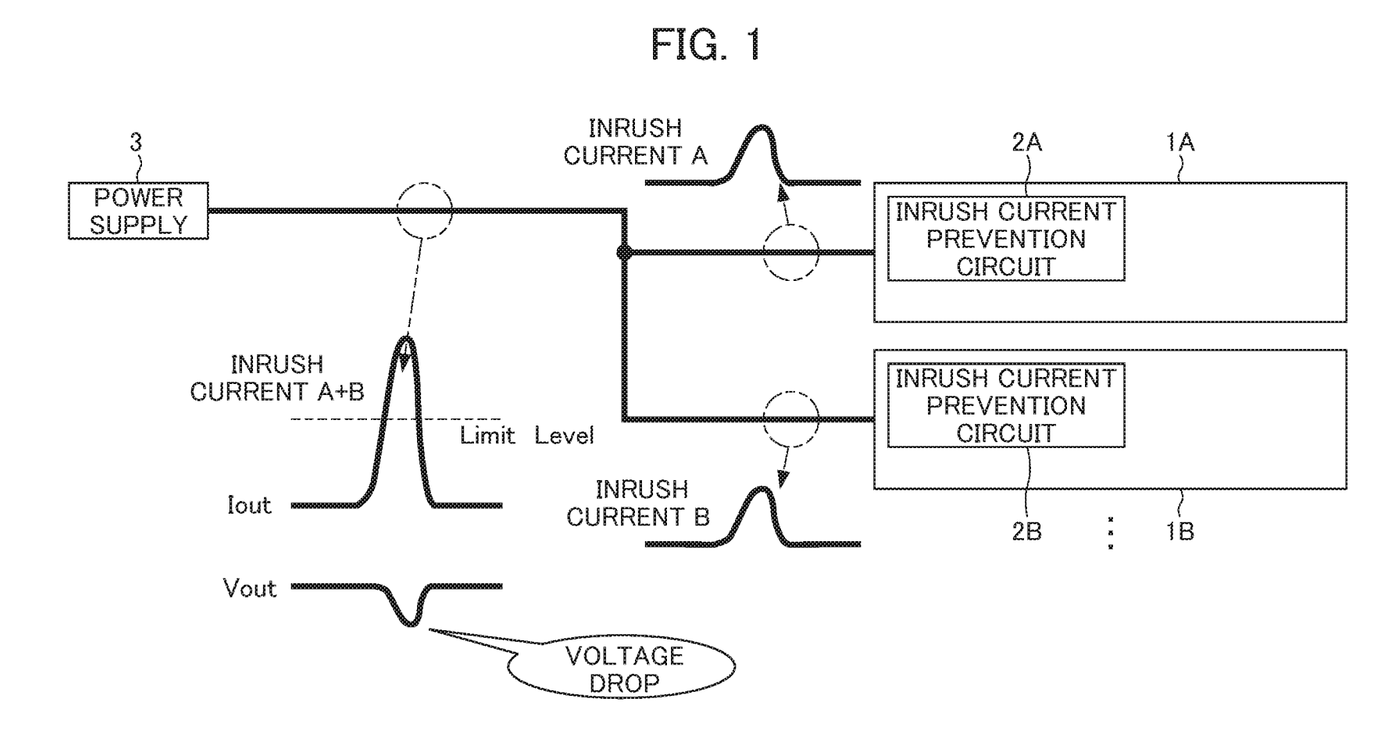
FIG. 1 is an explanatory diagram illustrating a case in which a voltage drop occurs in a system in which current is supplied from a single power supply to a plurality of apparatuses.

Hereinafter, an embodiment of the present invention will be described in detail with reference to the drawings. Prior to description of an inrush current prevention circuit according to the present embodiment, a case in which a voltage drop occurs in a system in which current is supplied from a single power supply to a plurality of apparatus will be described with reference to FIG. 1. As illustrated in FIG. 1, in order to suppress inrush currents input to apparatuses, an apparatus 1A and an apparatus 1B include inrush current prevention circuits 2A and 2B that suppress inrush currents A and B, respectively. However, there is an upper limit on the electric power supplied by a power supply 3, and an output voltage Vout of the power supply 3 decreases when an output current Iout of the power supply 3 exceeds an upper limit level. Specifically, when an inrush current A occurs in the apparatus 1A and an inrush current B occurs in the apparatus 1B, if the occurrence timings of the inrush currents A and B overlap, the output current Iout including the inrush currents A and B exceeds the upper limit level and the output voltage Vout decreases.

Hereinafter, an inrush current prevention circuit according to the present embodiment for preventing a voltage drop due to current capacity shortage in a power supply will be described.

First Embodiment

Figure 2:
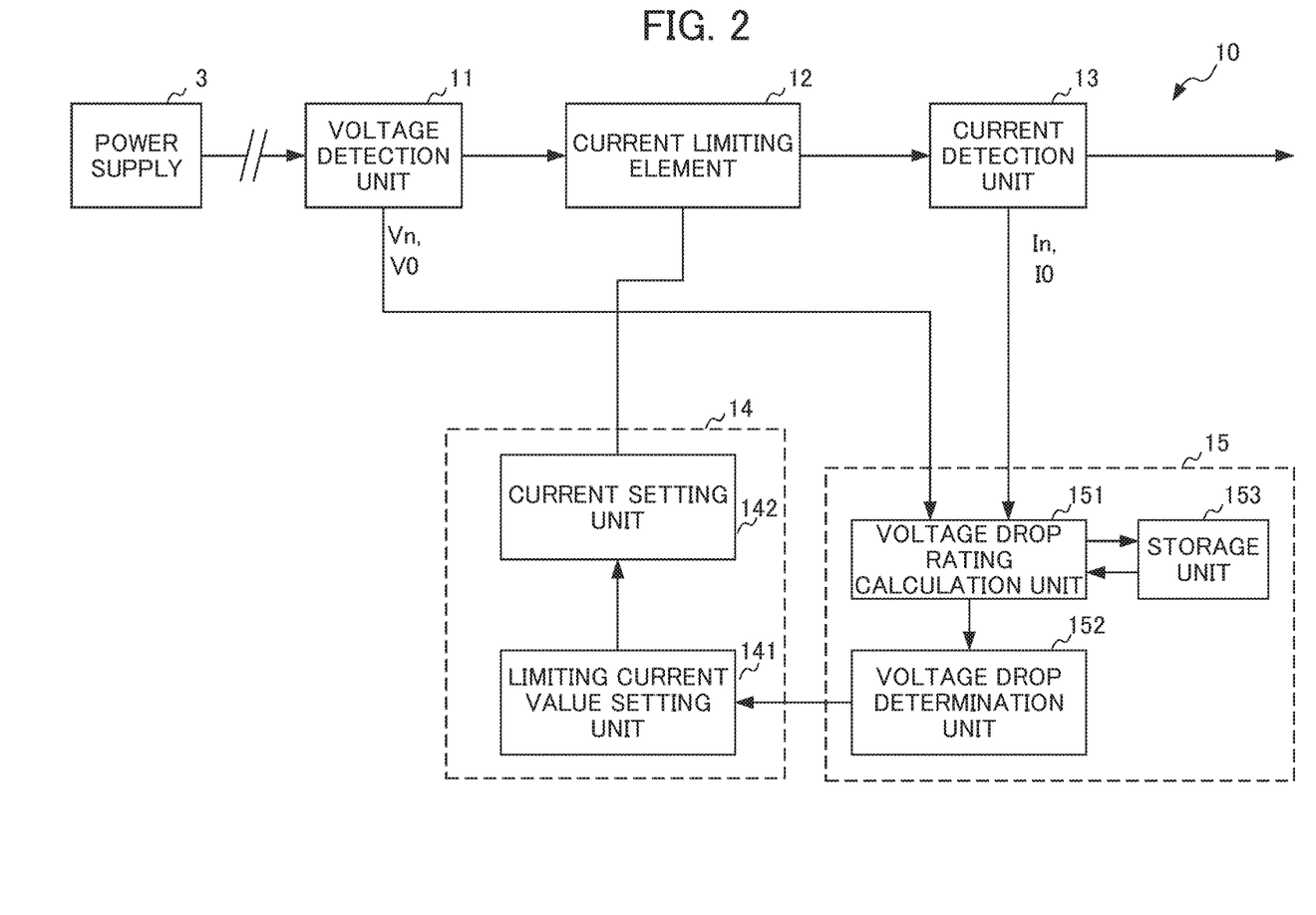
FIG. 2 is a block diagram illustrating a configuration of an inrush current prevention circuit according to a first embodiment of the present invention.

FIG. 2 is a block diagram illustrating a configuration of an inrush current prevention circuit according to a first embodiment of the present invention. An inrush current prevention circuit 10 of the present embodiment includes a voltage detection unit 11, a current limiting element 12, a current detection unit 13, a control unit 14, and a voltage drop detection unit 15. In FIG. 2, the voltage detection unit 11 detects the value of an input voltage applied by the power supply 3. The output of the voltage detection unit 11 is input to the current limiting element 12. The current limiting element 12 is an element that limits an input current, and an element capable of arbitrarily changing a conduction resistance using a control terminal which is a base or a gate of a field-effect transistor (FET), a bipolar transistor, or the like, for example, is used. The output of the current limiting element 12 is input to the current detection unit 13, and the current detection unit 13 detects the value of the input current input from the power supply 3.

A detection current value $V_n$ detected by the voltage detection unit 11 and a detection current value $I_n$ detected by the current detection unit 13 are input to the voltage drop detection unit 15 for detecting a voltage drop in the power supply 3 due to inrush currents. The voltage drop detection unit 15 includes a voltage drop rating calculation unit 151, a voltage drop determination unit 152, and a storage unit 153. The voltage drop rating calculation unit 151 calculates a rating R for detecting the symptom of a voltage drop. The voltage drop determination unit 152 determines whether a limiting current value of the current limiting element 12 will be changed on the basis of the rating R calculated by the voltage drop rating calculation unit 151. The storage unit 153 stores a reference value (a reference voltage value) $V_0$ of a voltage applied by the power supply 3 and a reference value (a reference current value) $I_0$ of the current supplied from the power supply 3. The reference voltage value $V_0$ is a voltage value when current does not flow, and the reference current value $I_0$ is a current value when an inrush current does not occur.

The voltage drop rating calculation unit 151 stores the reference voltage value $V_0$ and the reference current value $I_0$ in a storage unit 183. The voltage drop rating calculation unit 151 calculates the rating R according to Equation (1) below on the basis of the detection voltage value $V_n$, the detection current value $I_n$, and the reference voltage value $V_0$ and the reference current value $I_0$ stored in the storage unit 183.

$$R=(V_n-V_3)/(I_n-I_0) \quad (1)$$

When there is no voltage drop caused by an inrush current and the limiting of the current of the power supply 3, since a difference $(V_n-V_0)$ (hereinafter denoted by $\Delta V$) between the detection voltage value $V_n$ and the reference voltage value $V_0$ and a difference $(I_n-I_0)$ (hereinafter denoted by $\Delta I$) between the detection current value $I_n$ and the reference current value $I_0$ are substantially proportional to each other, the rating R is substantially a fixed value. A threshold LB is set by taking a variation of the fixed value into consideration. When (Rating R)<(Threshold LB) and a voltage drop is detected, the voltage drop determination unit 152 determines that "current limiting timing of the current limiting element 12 is necessary" and outputs a current limiting instruction signal and the rating R to a limiting current value setting unit 141 of the control unit 14. The control unit 14 includes the limiting current value setting unit 141 and a current setting unit 142. Examples of the causes of a voltage drop in an input unit of an apparatus include a variation in a reference voltage (for example, a voltage when an output current is 0) itself of a power supply, a voltage drop resulting from a wiring resistance from a power supply to an apparatus, and a voltage drop due to current capacity shortage in a power supply. However, by taking the difference $(V_n-V_0)$ between the detection voltage value $V_n$ and the reference voltage value $V_0$, it is possible to obviate the influence of a variation in the reference voltage itself of a power supply and a voltage drop resulting from the wiring resistance from a power supply to an apparatus.

Upon receiving the current limiting instruction signal from the voltage drop determination unit 152, the limiting current value setting unit 141 determines a current limiting level of the current limiting element 12 on the basis of the rating R. The current setting unit 142 decreases the current of the current limiting element 12 on the basis of the determined current limiting level. When the current limiting element 12 is a field-effect transistor (FET), the current setting unit 142 decreases the gate voltage of the current limiting element 12 to decrease the current of the current limiting element 12. In this example, although the limiting current value setting unit 141 determines the current limiting level of the current limiting element 12 on the basis of the rating R, the present invention is not limited thereto. For example, the limiting current value setting unit 141 may determine a predetermined current limiting level in response to the current limiting instruction signal only.

Figure 3:
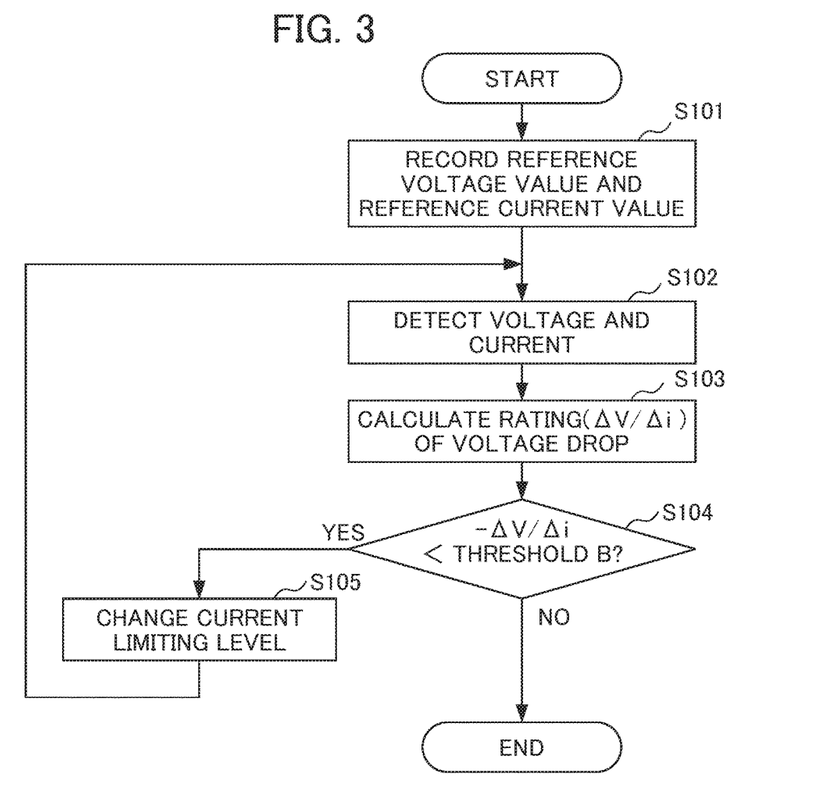
FIG. 3 is a flowchart for describing an operation of the inrush current prevention circuit of the present embodiment.

FIG. 3 is a flowchart for describing an operation of the inrush current prevention circuit according to the present embodiment. As illustrated in FIG. 3, first, in step S101, the voltage detection unit 11 detects the reference voltage value $V_0$ when no current flows, and the voltage drop rating calculation unit 151 stores the detected reference voltage value $V_0$ in a storage unit 153. Moreover, the current detection unit 13 detects the reference current value $I_0$ when no inrush current occurs, and the voltage drop rating calculation unit 151 stores the reference current value $I_0$ in a storage unit 153. Subsequently, in step S102, the voltage detection unit 11 detects the detection voltage value $V_n$ of the input voltage applied by the power supply 3, and the current detection unit 13 detects the detection current value In of the input current input from the power supply 3. After that, in step S103, the voltage drop rating calculation unit 151 calculates the rating R ($=-\Delta V/\Delta I$) for detecting the symptom of a voltage drop.

Subsequently, in step S104, the voltage drop determination unit 152 determines whether the rating R ($=-\Delta V/\Delta I$) is smaller than the threshold LB. When the voltage drop determination unit 152 determines that (Rating R)<(Threshold LB) and a voltage drop is detected (step S104: YES), the control unit 14 decreases the current limiting level of the current limiting element 12 on the basis of the rating R in step S105. After that, the process returns to step S102 and steps S102 to S105 are repeated. When the voltage drop determination unit 152 determines that (Rating R)≥(Threshold LB) (step S104: No), the process ends.

In the present embodiment described above, even when the occurrence timings of inrush currents in a plurality of apparatuses overlap each other, since the voltage drop detection unit detects the symptom of a voltage drop due to current capacity shortage in a power supply and the control unit decreases the current limiting level of the current limiting element, the present embodiment has an advantage that malfunctioning of an apparatus resulting from a voltage drop can be prevented.

Second Embodiment

Figure 4:
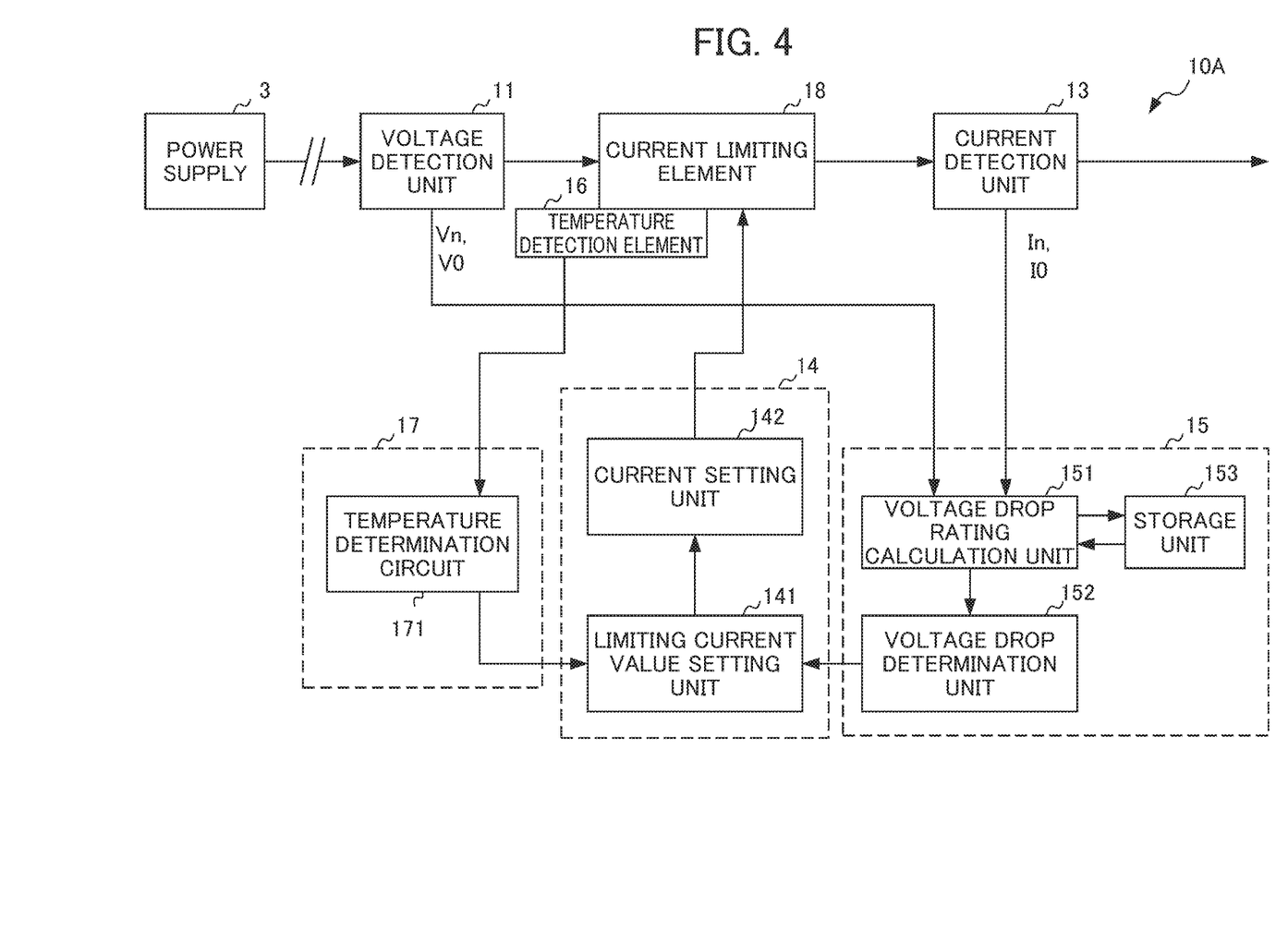
FIG. 4 is a block diagram illustrating a configuration of an inrush current prevention circuit according to a second embodiment of the present invention.

FIG. 4 is a block diagram illustrating a configuration of an inrush current prevention circuit according to a second embodiment of the present invention. In an inrush current prevention circuit 10A of the present embodiment, a temperature detection element 16 and a temperature determination unit 17 are added as compared to the inrush current prevention circuit 10 of the first embodiment illustrated in FIG. 2. Moreover, in the inrush current prevention circuit 10A of the present embodiment, the current limiting element 12 illustrated in FIG. 2 is replaced with a current limiting element 18 that can perform a current interruption operation as well as a current limiting operation. In FIG. 4, the same constituent members as those of the inrush current prevention circuit 10 of the first embodiment illustrated in FIG. 2 are denoted by the same reference numerals, and description of the same constituent members will be omitted.

The current limiting element 18 is an element that limits an input current and interrupts current, and an element capable of interrupting current and arbitrarily changing a conduction resistance using a control terminal which is a base or a gate of a field-effect transistor (FET), a bipolar transistor, or the like, for example, is used. The temperature detection element 16 is an element that detects the temperature of the current limiting element 18, and a PTC (positive temperature coefficient) thermistor, a thermocouple, or the like is used. The temperature detection element 16 can detect a loss of the current limiting element 18 by detecting the temperature of the current limiting element 18. The detection temperature value detected by the temperature detection element 16 is input to the temperature determination unit 17. The temperature determination unit 17 includes a temperature determination circuit 171. The temperature determination circuit 171 determines whether the detection temperature value Tj is lower than an upper limit threshold LA and is equal to or lower than a lower limit threshold LC (LA>LC). The upper limit threshold LA and the lower limit threshold LC are determined appropriately depending on the characteristics of a current limiting element, and the lower limit threshold LC may be set to a value that is approximately 20° C. lower than the upper limit threshold LA, for example.

The temperature determination circuit 171 sends an interrupt instruction signal to the limiting current value setting unit 141 of the control unit 14 when the detection temperature value Tj exceeds the upper limit threshold LA. Upon receiving the interrupt instruction signal, the limiting current value setting unit 141 interrupts a current of the current limiting element 18 with the aid of the current setting unit 142. When the current limiting element 18 is a field-effect transistor (FET), the limiting current value setting unit 141 interrupts the current by the current setting unit 142 setting the gate voltage to 0 V, for example. After the current is interrupted, when it is determined that the detection temperature value Tj is equal to or lower than the lower limit threshold LC, the temperature determination circuit 171 sends an interrupt cancel signal to the limiting current value setting unit 141. The limiting current value setting unit 141 having received the interrupt cancel signal cancels interruption of the current of the current limiting element 18 with the aid of the current setting unit 142 and supplies current again.

Figure 5:
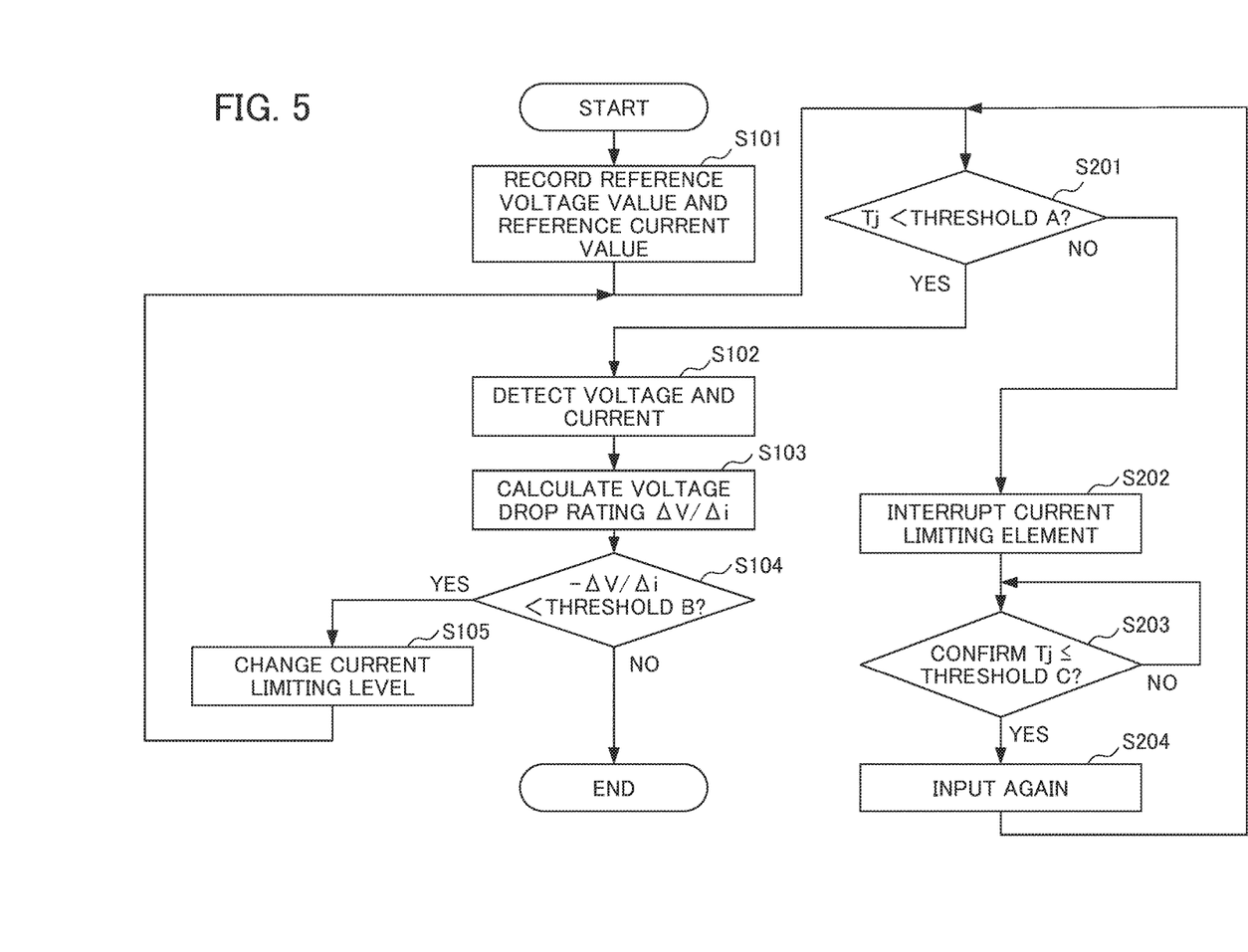
FIG. 5 is a flowchart for describing an operation of the inrush current prevention circuit of the present embodiment.

FIG. 5 is a flowchart for describing an operation of the inrush current prevention circuit of the present embodiment. As illustrated in FIG. 5, in the operation of the present embodiment, steps S201 to S204 are added as compared to the operation of the first embodiment illustrated in FIG. 3. In FIG. 5, the same steps as those of the first embodiment illustrated in FIG. 3 will be denoted by the same reference numerals, and description of the same steps will be omitted.

In step S201 subsequent to step S101, the temperature determination circuit 171 determines whether the detection temperature value Tj of the current limiting element 18 is lower than the upper limit threshold LA. In step S201, when the temperature determination circuit 171 determines that the detection temperature value Tj exceeds the upper limit threshold LA (step S201: NO), the limiting current value setting unit 141 interrupts the current of the current limiting element 18 with the aid of the current setting unit 142 in step S202. It is possible to suppress a loss of the current limiting element 18 by interrupting the current of the current limiting element 18. In step S201, when the temperature determination circuit 171 determines that the detection temperature value Tj is lower than the upper limit threshold LA (step S201: YES), the flow proceeds to step S102.

Subsequently, in step S203, the temperature determination circuit 171 determines whether the detection temperature value Tj is equal to or lower than the lower limit threshold LC. When the temperature determination circuit 171 determines that the detection temperature value Tj is equal to or lower than the lower limit threshold LC (step S203: YES), the limiting current value setting unit 141 cancels the interruption of the current of the current limiting element 18 with the aid of the current setting unit 142 and supplies current again in step S204. After that, the process returns to step S201 and steps S102 to S105 and steps S201 to S204 are repeated. In step S203, when the temperature determination circuit 171 determines that the detection temperature value Tj exceeds the lower limit threshold LC (step S203: NO), the limiting current value setting unit 141 continues interrupting the current of the current limiting element 18. In step S203, the temperature determination circuit 171 determines whether the detection temperature value Tj is equal to or lower than the lower limit threshold LC again. Although step S201 is placed before step S102, step S201 may be placed after step S104. That is, steps S201 to S204 may be performed after step S104 is performed.

Figure 6:
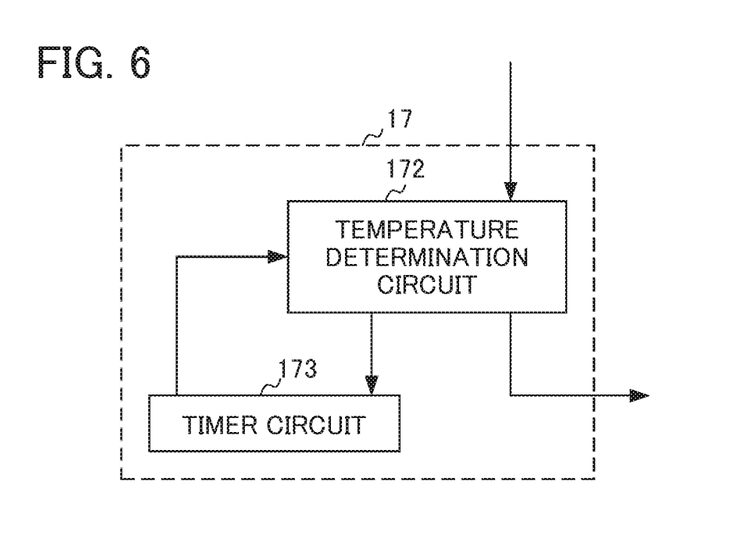
FIG. 6 is a block diagram illustrating another configuration example of a temperature determination unit according to the second embodiment.

In the present embodiment described above, similarly to the first embodiment, it is possible to suppress a loss of a certain value or more of the current limiting element 18 as well as preventing malfunctioning of an apparatus resulting from a voltage drop. As illustrated in FIG. 6, the temperature determination unit 17 of the second embodiment may include a temperature determination circuit 172 and a timer circuit 173 as a time measurement unit. The temperature determination circuit 172 determines whether the detection temperature value Tj is lower than the upper limit threshold LA. The temperature determination circuit 172 sends an interrupt instruction signal to the limiting current value setting unit 141 when the detection temperature value Tj exceeds the upper limit threshold LA. However, the temperature determination circuit 172 does not determine whether the detection temperature value Tj is equal to or lower than the lower limit threshold LC (LA>LC) unlike the temperature determination circuit 171 illustrated in FIG. 4. In the temperature determination unit 17 illustrated in FIG. 6, the timer circuit 173 measures the time elapsed from the time point (corresponding to a current interruption starting time point) at which the temperature determination circuit 172 sent the interrupt instruction signal to the limiting current value setting unit 141. When the elapsed time reaches a time sufficient for the temperature of the current limiting element 18 to decrease to a predetermined temperature or lower, the temperature determination circuit 172 sends an interrupt cancel signal to the limiting current value setting unit 141.

In the description above, the temperature determination unit 17 illustrated in FIG. 4 or FIG. 6 controls the control unit 14 to interrupt the current of the current limiting element 18 when it is determined that the detection temperature value Tj exceeds the upper limit threshold LA. However, the present invention is not limited thereto. Current interruption is one mode of a protection operation of the current limiting element, and the current limiting element may perform other protection operations. For example, as a mode of a protection operation, when the temperature determination unit 17 determines that the detection temperature value Tj exceeds the upper limit threshold LA, the control unit 14 may decrease the temperature of the current limiting element using a cooling element provided to lower the temperature of the current limiting element, or, alternatively, the control unit 14 may call an administrator's attention by outputting a warning sound and turning on a display element. By calling the administrator's attention, the administrator can interrupt the current manually or using a switch provided separately.

While the embodiments of the present invention have been described, all or some of the functions of the control unit 14, the temperature determination unit 17, and the voltage drop detection unit 15 of the inrush current prevention circuit may be realized by hardware, software, or a combination thereof. Here, a function being realized by software means that the function is realized by a computer reading and executing a program. When the function is configured by hardware, all or some of the control unit 14, the temperature determination unit 17, and the voltage drop detection unit 15 of the inrush current prevention circuit may be configured as integrated circuits (ICs) such as LSI (Large Scale Integrated circuit), ASIC (Application Specific Integrated Circuit), gate array, and FPGA (Field Programmable Gate Array).

When the function is realized by software, all or some of the control unit 14, the temperature determination unit 17, and the voltage drop detection unit 15 (excluding the storage unit 153) of the inrush current prevention circuit are configured as a computer that includes a CPU, and a storage unit such as a hard disk or a ROM that stores a program therein. Moreover, information necessary for calculation is stored in a second storage unit such as a RAM and processes are executed according to a program corresponding to the block diagram of FIG. 2 and the flowchart of FIG. 3 and a program corresponding to the block diagram of FIG. 4 and the flowchart of FIG. 5, and thus all or some of the operations of the control unit 14, the temperature determination unit 17, and the voltage drop detection unit 15 (excluding the storage unit 153) of the inrush current prevention circuit are executed by the program.

The program can be stored using various types of computer readable media and can be supplied to a computer. The computer readable medium includes various types of tangible storage media and includes non-transitory computer readable media. Examples of a non-transitory computer readable medium include magnetic recording media (for example, flexible disks and hard disk drives), magneto-optical recording media (for example, magneto-optical discs), CD-ROM (Read Only Memory), CD-R, CD-R/W, and semiconductor memories (for example, mask ROM, PROM (Programmable ROM), EPROM (Erasable PROM), flash memory, and RAM (random access memory)). The present invention is not limited to the above-described embodiments and can be changed and modified in various ways. For example, although the rating R for evaluating the voltage drop is calculated according to Equation 1, a value $V_n/I_n$ obtained by dividing the detection voltage value $V_n$ by the detection current value $I_n$ may be used as the rating.

EXPLANATION OF REFERENCE NUMERALS 1A, 1B: Apparatus
2A, 2B: Inrush current prevention circuit
3: Power supply
10, 10A: Inrush current prevention circuit
11: Voltage detection unit
12: Current limiting element
13: Current detection unit
14: Control unit
15: Voltage drop detection unit
16: Temperature detection element
17: Temperature determination unit
18: Current limiting element
173: Timer circuit (Time measuring unit)

What is claimed is:
1. An inrush current prevention circuit comprising:
a voltage detection unit configured to detect a value of an input voltage applied by a power supply;
a current detection unit configured to detect a value of an input current input from the power supply;
a current limiting element configured to limit the input current;
a voltage drop detection unit configured to detect a voltage drop in the power supply resulting from inrush currents using a detection voltage value detected by the voltage detection unit and a detection current value detected by the current detection unit; and
a control unit configured to decrease a current limiting level of the current limiting element when the voltage drop detection unit detects the voltage drop, wherein the voltage drop detection unit detects the voltage drop based on a value obtained by dividing the detection voltage value by the detection current value.

2. The inrush current prevention circuit according to claim 1, further comprising:
   a temperature detection element configured to detect the temperature of the current limiting element; and
   a temperature determination unit configured to determine whether a detection temperature value detected by the temperature detection element exceeds an upper limit threshold, wherein
   the control unit performs a protection operation of the current limiting element when the temperature determination unit determines that the detection temperature value exceeds the upper limit threshold.

3. The inrush current prevention circuit according to claim 2, wherein
   the protection operation involves interrupting the current of the current limiting element,
   the temperature determination unit determines whether the detection temperature value of the current limiting element is equal to or lower than a lower limit threshold, and
   the control unit cancels interruption of the current of the current limiting element when the detection temperature value of the current limiting element is equal to or lower than the lower limit threshold.

4. The inrush current prevention circuit according to claim 2, wherein
   the protection operation involves interrupting the current of the current limiting element,
   the temperature determination unit includes a time measuring unit that measures a time elapsed from a time point at which an interrupt instruction signal is sent to the control unit, and
   the control unit cancels interruption of the current of the current limiting element when the elapsed time reaches a time sufficient for the temperature of the current limiting element to decrease to a predetermined temperature or lower.

5. An inrush current prevention circuit comprising:
   a voltage detection unit for detecting a value of an input voltage applied by a power supply;
   a current detection unit for detecting a value of an input current input from the power supply;
   a current limiting element for limiting the input current;
   a voltage drop detection unit for detecting a voltage drop in the power supply resulting from inrush currents using a detection voltage value detected by the voltage detection unit and a detection current value detected by the current detection unit; and
   a control unit for decreasing a current limiting level of the current limiting element when the voltage drop detection unit detects the voltage drop,
   wherein the voltage drop detection unit detects the voltage drop based on a value obtained by dividing a difference between the detection voltage value and a reference voltage value by a difference between the detection current value and a reference current value.

6. An inrush current prevention method in an inrush current prevention circuit, the method comprising:
   detecting a value of an input voltage applied by a power supply;
   detecting a value of an input current input from the power supply;
   detecting a voltage drop in the power supply resulting from inrush currents based on a value obtained by dividing the detected value of the input voltage by the detected value of the input current; and
   decreasing a current limiting level of a current limiting element that limits the input current when the voltage drop is detected.

7. The inrush current prevention method according to claim 6, further comprising:
   detecting the temperature of the current limiting element using a temperature detection element;
   determining whether a detection temperature value detected by the temperature detection element exceeds an upper limit threshold; and
   performing a protection operation of the current limiting element when it is determined that the detection temperature value exceeds the upper limit threshold.

8. The inrush current prevention method according to claim 7, wherein
   the protection operation involves interrupting the current of the current limiting element, the method further comprising:
   determining whether the detection temperature value of the current limiting element is equal to or lower than a lower limit threshold, and
   canceling interruption of the current of the current limiting element when the detection temperature value of the current limiting element is equal to or lower than the lower limit threshold.

9. The inrush current prevention method according to claim 7, wherein
   the protection operation involves interrupting the current of the current limiting element, the method further comprising:
   measuring a time elapsed from a current interruption starting time point using a time measuring unit;
   canceling interruption of the current of the current limiting element when the elapsed time reaches a time sufficient for the temperature of the current limiting element to decrease to a predetermined temperature or lower.

10. An inrush current prevention method
    in an inrush current prevention circuit, the method comprising:
    detecting a value of an input voltage applied by a power supply;
    detecting a value of an input current input from the power supply;
    detecting a voltage drop in the power supply resulting from inrush currents based on a value obtained by dividing a difference between the detected value of the input voltage and a reference voltage value by a difference between the detected value of the input current and a reference current value; and
    decreasing a current limiting level of a current limiting element that limits the input current when the voltage drop is detected.

11. An inrush current prevention program being used in an inrush current prevention circuit comprising:
    a voltage detection unit for detecting a value of an input voltage applied by a power supply;
    a current detection unit for detecting a value of an input current input from the power supply;
    a current limiting element for limiting the input current;
    a voltage drop detection unit for detecting a voltage drop in the power supply; and
    a control unit for decreasing a current limiting level of the current limiting element when the voltage drop detection unit detects the voltage drop, the program causing a computer as the voltage drop detection unit to execute:

detecting the voltage drop in the power supply resulting from inrush currents based on a value obtained by dividing the value of the input voltage detected by the voltage detection unit, by the value of the input current detected by the current detection unit; and notifying the control unit of the detected voltage drop.

* * * * *